United States Patent
Kolanek et al.

[11] Patent Number: 5,870,436
[45] Date of Patent: Feb. 9, 1999

[54] UNIFORM DISCRETE FOURIER TRANSFORM FILTER PARAMETER ENCODER

[75] Inventors: James C. Kolanek; Thomas A. Bryan, both of Goleta, Calif.

[73] Assignee: Raytheon Company, Lexington, Mass.

[21] Appl. No.: 778,054

[22] Filed: Jan. 2, 1997

[51] Int. Cl.$^6$ .............................. H03K 9/00; H04L 29/06
[52] U.S. Cl. ......................... 375/316; 375/204; 370/210
[58] Field of Search .................................. 375/204, 240, 375/273, 285, 377, 340, 350, 260, 316, 239, 349; 364/724.1, 726.02, 724.13, 726.03, 726.01, 484; 370/208, 210, 343, 344, 480, 482, 497

[56] References Cited

U.S. PATENT DOCUMENTS

| | | | |
|---|---|---|---|
| 4,893,266 | 1/1990 | Deem | 364/726 |
| 5,323,391 | 6/1994 | Harrison | 375/349 |
| 5,537,435 | 7/1996 | Carney et al. | 375/219 |
| 5,602,876 | 2/1997 | Noneman et al. | 375/317 |

*Primary Examiner*—Chi H. Pham
*Assistant Examiner*—Bayard Emmanuel
*Attorney, Agent, or Firm*—Michaelson & Wallace

[57] ABSTRACT

The invention is embodied in a parameter encoder for identifying selected parameters of a digitally sampled incoming signal lying within a receiver bandwidth, wherein the receiver bandwidth is divided into plural contiguous frequency channels, each channel having a channel bandwidth, whereby the incoming signal is divided into plural channelized signals lying in respective ones of the plural frequency channels, the parameter encoder includes plural channel processors connected to receive respective ones of the channelized signals, each of the channel processors including Fourier transform apparatus for producing a frequency value and an amplitude value for each sample of the respective channelized signal. The parameter encoder embodying the invention further includes a channel arbitrator including comparator apparatus for comparing the amplitude value with a predetermined threshold, comparing the amplitude value with the corresponding amplitude values of adjacent ones of the channels and comparing the frequency value with corresponding frequency values of adjacent ones of the channels, and processor apparatus for sensing whether a detected signal lies in the respective channel based upon at least one of: (a) determination of a corresponding amplitudes values of the respective channel and its adjacent neighbor channels relative to the predetermined threshold, (b) determination of predominance of the frequency value over corresponding frequency values of adjacent neighbor channels, (c) determination of a difference between the frequency value and that of an adjacent neighbor channel exceeding a predetermined frequency threshold.

31 Claims, 10 Drawing Sheets

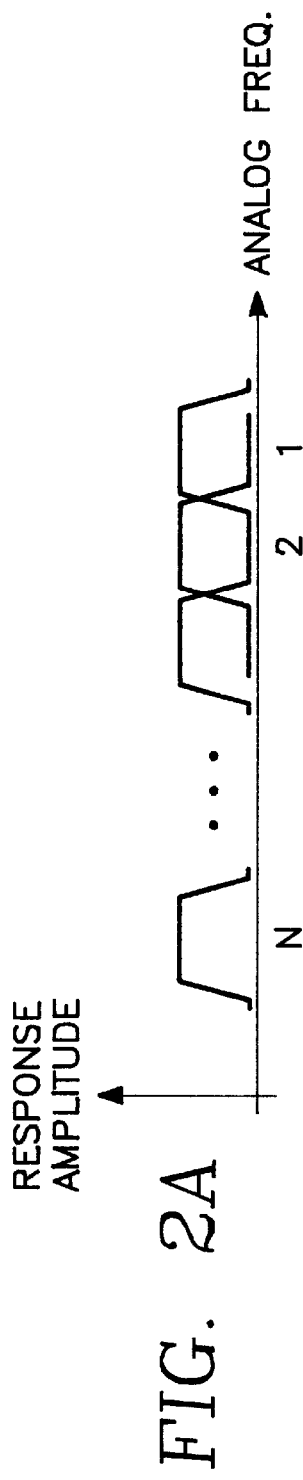
FIG. 2A
FIG. 2B
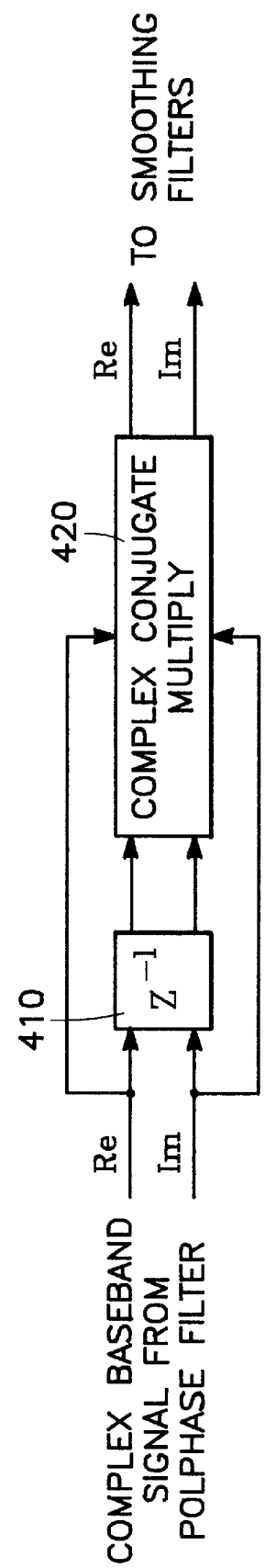
FIG. 4

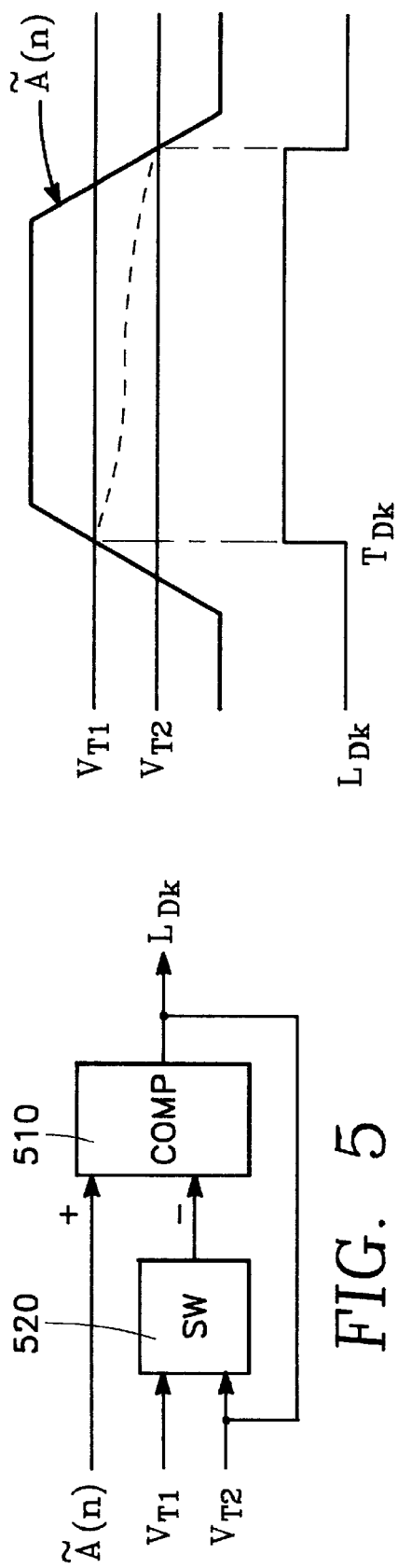
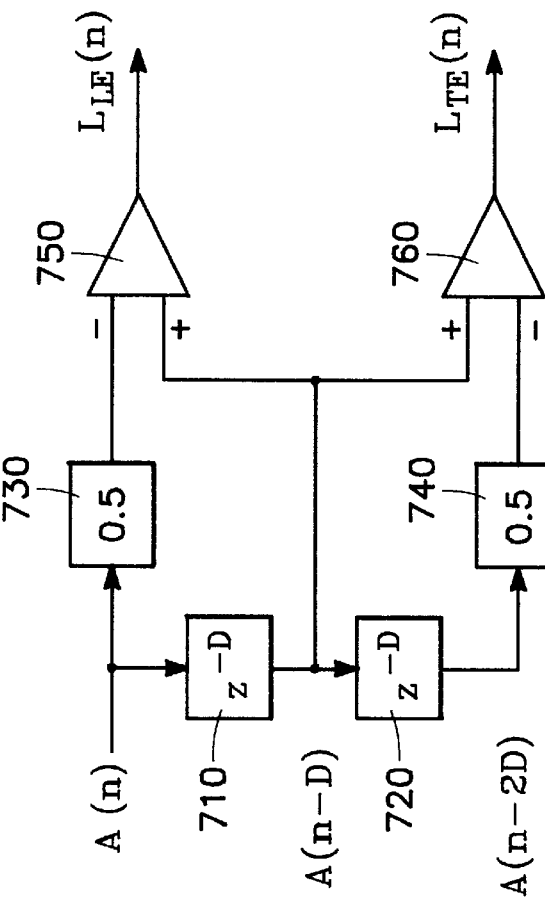
FIG. 6
FIG. 5
FIG. 7

| LOGIC TEST NO. | LOGIC TEST | TEST CASE | | | | | | | | |
|---|---|---|---|---|---|---|---|---|---|---|
| | | $P_1$ | $P_2$ | $P_3$ | $P_4$ | $P_5$ | $P_6$ | $P_7$ | $P_8$ | $P_9$ |
| $L_1$ | $A_{k+1} > V_{T2}$ | F | T | F | T | T | F | T | T | T |
| $L_2$ | $A_k > V_{T2}$ | T | T | T | T | T | T | T | T | T |
| $L_3$ | $A_{k-1} > V_{T2}$ | F | F | T | T | F | T | T | T | T |
| $L_4$ | $A_k > A_{k+1}$ | | T | | T | F | | T | F | F |
| $L_5$ | $A_k > A_{k-1}$ | | | T | T | | F | F | T | F |
| $L_6$ | $|f_k - f_{k+1}| > F_\Delta$ | | | | | T | | T | | T |
| $L_7$ | $|f_k - f_{k-1}| > F_\Delta$ | | | | | | T | | T | T |
| $L_{CA}$ VALID CHANNEL ARBITRATION | | T | T | T | T | T | T | T | T | T |

FIG. 8

| LOGIC TEST NO. | LOGIC TEST | TEST CASE | |
|---|---|---|---|
| | | $P_1$ | $P_2$ |
| $L_1$ | $F_{(k)} < F_{LOW}$ | F | T |
| $L_2$ | $F_{(k)} > F_{HI}$ | T | F |
| $L_3$ | $A_{(k+1)} > V_{FT}$ | T | T |
| $L_4$ | $A_{(k-1)} > V_{FT}$ | T | T |
| $L_5$ | $A_{(k+1)} > A_{(k-1)}$ | T | T |
| | $F_{PDW} =$ | $F(k)-1$ | $F(k)+1$ |

OTHERWISE $F_{PDW} = F(k)$

FIG. 9

UNIFORM DISCRETE FOURIER TRANSFORM FILTER PARAMETER ENCODER

BACKGROUND OF THE INVENTION

1. Technical Field

The invention is related to parameter encoders of the type which classify a received RF signal in accordance with a predetermined set of parameters, such as frequency, pulse width, amplitude, time of arrival, type of modulation, and the like.

2. Background Art

Various digital RF receiver systems include a digital channelizer which divides a wide receiver frequency band into many narrow frequency "bins" or channels, so that the receiver can and digitally process each individual channel separately. Such a digital RF receiver may be employed in a digital cellular telephone system, for example. As another example, it may be employed with a parameter encoder. A parameter encoder is a device in a digital RF receiver which characterizes each received RF signal in accordance with a predetermined set of parameters, such as frequency, pulse width, amplitude, time of arrival, type of modulation, and the like, and transmits that information to a user. The user may be an electronic communication system. The division of the wide frequency band into narrow channels is best performed using uniform polyphase filter banks of the type well-known in the art. The highest RF frequency which can be processed is limited by the sampling rate capability of the polyphase filters. As is well-known, the Nyquist rate is the minimum sampling rate at which a particular RF frequency can be measured, and is equal to twice the particular RF frequency. The bank of polyphase filters must be able to run at the Nyquist rate corresponding to the highest frequency of the RF band of the receiver. Stated differently, the reason that a filter bank would be operated at this rate is that this is the slowest rate at which it can be operated to cover the receiver's RF frequency band, and determines the clock rate for which the hardware must be designed. By thus minimizing the hardware clock rate, hardware costs are minimized.

Digital receivers using uniform polyphase filter banks operating at the Nyquist rate suffer from the problem of aliasing between channels. Aliasing is a problem that occurs in all digital systems, and manifests itself by making frequencies outside the Nyquist bandwidth map to frequencies that are either higher or lower than the actual frequency of the received signal, a significant problem.

One way of eliminating aliasing between channels is to oversample the received signal and run the hardware including the polyphase filter banks at a rate exceeding the Nyquist rate. However, oversampling the signal and running the hardware at the higher rate is not desirable because it makes building the hardware for a wide frequency bandwidth (e.g., 1 GHz) costly or difficult, if not impossible with current technology.

Another way of eliminating aliasing between channels for a given RF signal bandwidth is to employ filters with narrower frequency bins (i.e., "narrower" filters) and employ a proportionately greater number of such narrower filters in the polyphase filter bank. However, narrowing the filters and increasing their number is not desirable because it increases the physical size of the hardware, and therefore increases the power consumption and heat dissipation.

The present invention is directed to eliminating or ameliorating the problem of aliasing between channels without increasing the sampling rate and without increasing the number of filters. In particular, the invention is directed to more reliable ways of processing a received signal whose apparent frequency is near a frequency boundary separating adjacent channels. More specifically, the invention is directed to a more reliable measurement of the frequency of a received signal of a frequency near the boundary between adjacent channels.

SUMMARY OF THE INVENTION

The invention is embodied in a parameter encoder for identifying selected parameters of a digitally sampled incoming signal lying within a receiver bandwidth, wherein the receiver bandwidth is divided into plural contiguous frequency channels, each channel having a channel bandwidth, whereby the incoming signal is divided into plural channelized signals lying in respective ones of the plural frequency channels, the parameter encoder includes plural channel processors connected to receive respective ones of the channelized signals, each of the channel processors including Fourier transform apparatus for producing a frequency value and an amplitude value for each sample of the respective channelized signal. The parameter encoder embodying the invention further includes a channel arbitrator including comparator apparatus for comparing the amplitude value with a predetermined threshold, comparing the amplitude value with the corresponding amplitude values of adjacent ones of the channels and comparing the frequency value with corresponding frequency values of adjacent ones of the channels, and processor apparatus for sensing whether a detected signal lies in the respective channel based upon at least one of: (a) determination of a corresponding amplitudes values of the respective channel and its adjacent neighbor channels relative to the predetermined threshold, (b) determination of predominance of the frequency value over corresponding frequency values of adjacent neighbor channels, (c) determination of a difference between the frequency value and that of an adjacent neighbor channel exceeding a predetermined frequency threshold.

The channel processor can further include a frequency arbitrator including comparator apparatus for comparing the frequency value with upper and lower threshold frequencies near the maximum and minimum frequencies of the corresponding frequency channel, and for comparing amplitude values of adjacent neighbor channels with each other and with a predetermined threshold, processor apparatus for sensing whether the frequency value lies near one extreme of the frequency band of the channel and needs correcting by shifting it toward the opposite extreme, based upon at least one of: (a) determination of the frequency value lying outside a band between the upper and lower frequencies, (b) determination of amplitude values of adjacent neighbor channels, corresponding in time with to the amplitude value, exceeding a predetermined threshold, (c) determination of an inequality between the amplitude values of the neighbor channels.

The channel processor can further include a modulation on pulse identifier responsive to the channel arbitrator indicating a valid signal is present in the respective channel, the identifier including apparatus for sensing chip transients in successive samples of the frequency value of the channelized signal, apparatus for measuring the time durations of the chip transients, apparatus for counting a first number of the chip transients having time durations falling within a predetermined low range and for counting a second number of the chip transients having time durations exceeding the low range, and apparatus for classifying modulation in the channelized signal in accordance with the first and second numbers. The apparatus for classifying classifies the modulation as phase modulation if the first number exceeds the second number and for classifying it as one of frequency modulation and FM chirp otherwise.

The channel processor can further include apparatus for providing a time rate of change of the frequency value, wherein the classifying apparatus discriminates between frequency modulation and FM chirp in accordance with a value of the time rate of change of the frequency value.

The channel processor can further include a least squares estimator for providing an estimate of the frequency over plural samples of the channelized signal, the frequency estimator receiving the successive samples of the frequency value and outputting a least squares estimate of frequency, the apparatus for providing a time rate of change of frequency includes a frequency time rate of change output of the least squares estimator.

The Fourier transform apparatus preferably includes a complex conjugate multiplier for multiplying each of the real and imaginary components by a one-sample-time delayed complex conjugate thereof, and a transformer for transforming a complex number whose real and imaginary components are the real and imaginary products from the complex conjugate multiplier into polar coordinates.

The channel processor further includes a state sequencer, the sequencer including apparatus for indicating occurrence of a steady state region of the pulse of an amplitude within a second predetermined fraction of the peak amplitude exceeding the first fraction, wherein the modulation on pulse identifier performs the counting in response to the apparatus for indicating occurrence of a steady state region of the pulse.

The sequencer further includes apparatus for indicating a leading and trailing edge of a pulse in the respective channel corresponding to a first predetermined fraction of a peak pulse amplitude. In this case the channel processor can further include a time of arrival encoder responsive to occurrence of the leading edge, a pulse width encoder responsive to a time interval between occurrence of the leading and trailing edges, and an amplitude encoder responsive to occurrence of the steady state region for computing an average of successive amplitude samples over the steady state region.

The state sequencer may further include apparatus for indicating a continuous wave signal in the respective channel whenever a trailing edge fails to occur after a leading edge within a predetermined amount of time.

The channel processor may include a least squares estimator for providing an estimate of the frequency over plural samples of the channelized signal, the frequency estimator receiving the successive samples of the frequency value and outputting a least squares estimate of frequency, the estimator being responsive to the sequencer so as to take the plural samples only from the steady state region of the channelized signal.

The channel processor may further include a threshold detector for detecting the presence of a pulse in the respective channel, the threshold detector including apparatus for indicating the beginning of a valid pulse after the amplitude value exceeds a first predetermined pulse threshold value, and apparatus for indicating the end of a valid pulse after the amplitude value falls below a second predetermined pulse threshold value less than the first predetermined pulse threshold value.

The amplitude encoder preferably includes apparatus for enabling the computing of the average only when the number of samples equals a power of two, and wherein the average is computed by binarily shifting a sum of amplitude samples by an amount corresponding to the power of two.

The modulation on pulse identifier preferably includes a delay line frequency discriminator and an anti-wrap circuit connected between the frequency discriminator and the apparatus for detecting a frequency chip transient. Also, the channel processor preferably includes an anti-wrap circuit at an input of the estimator for stabilizing successive samples of the frequency value.

The least squares estimator preferably includes a high speed section including a first delay line summation loop for computing a sum of frequency samples, a counter for generating a sample count, a multiplier for multiplying each frequency sample by the corresponding sample count and a second delay line summation loop for computing a sum of products of the multiplier, and apparatus responsive to the sequencer for enabling the first and second summation loops at a beginning of the steady state and terminating the first and second summation loops and latching the sample count upon the occurrence of the trailing edge. In a low speed section there is apparatus for generating a least squares matrix operator as a function of the sample count from the apparatus for latching, and for matrix multiplying a 2-element vector whose first and second elements include the outputs of the first and second summation loops, respectively, by the least squares matrix operator.

BRIEF DESCRIPTION OF THE DRAWINGS

FIGS. 2A and 2B illustrate frequency domain responses of the digital channelizer in the parameter encoder of FIG. 1, FIG. 2B being an enlargement of a portion of FIG. 2A.

FIG. 4 is a block diagram of a delay line frequency discriminator in the channel processing module of FIG. 3.

FIG. 5 is a block diagram of a preferred threshold detector circuit employed in the channel processing module of FIG. 3.

FIG. 6 is a graph including a time domain waveform of an incoming pulse illustrating the operation of the threshold detector of FIG. 5.

FIG. 7 is a block diagram of a preferred leading edge/trailing edge detector employed in the channel processing module of FIG. 3.

FIG. 8 is a truth table defining a channel arbitration function of arbitration logic in the channel processing module of FIG. 3.

FIG. 9 is a truth table defining a frequency arbitration function of the arbitration logic of the channel processing module of FIG. 3.

DETAILED DESCRIPTION OF THE PREFERRED EMBODIMENTS

Figure 1:
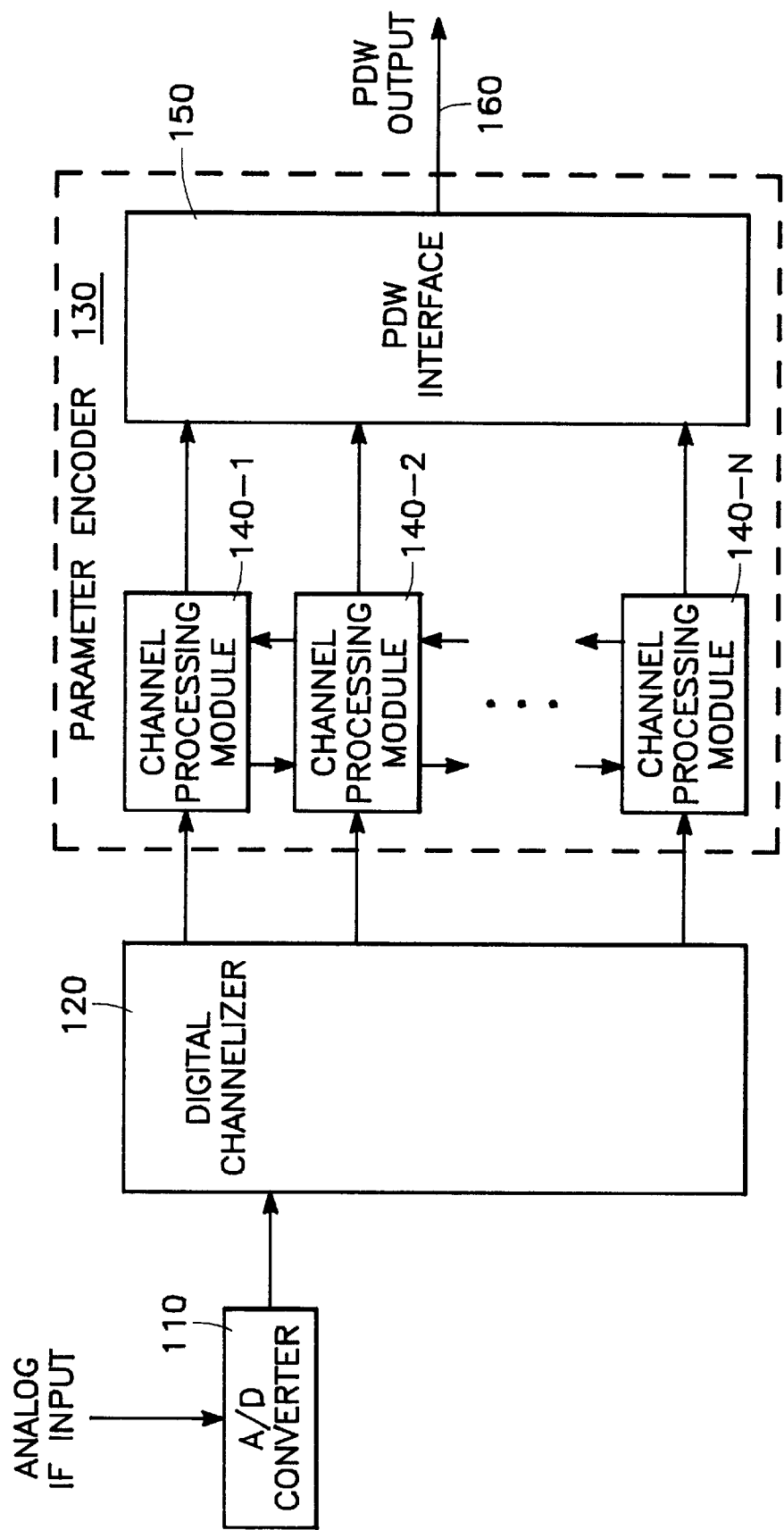
FIG. 1 is a block diagram illustrating a parameter encoder including an array of channel processing modules embodying the invention.

Referring to FIG. 1, a digital RF receiver receives an analog RF input which an analog-to-digital converter 110 converts to a stream of digital words U(n) at a very high sampling rate. The index n refers to an individual word in the stream. Each digital word output by the analog-to-digital converter is real-valued. A digital channelizer 120 divides the incoming signal U(n) into N channels corresponding to N frequency bins of predetermined bin ranges covering the RF band of the receiver, to produce N channelized signals $X_k$(n), where k is an index from 1 through N and specifies one of the N channels. Each of the channelized signals is complex, consisting of real and imaginary parts represented by a stream of digital words. Preferably, the digital channelizer consists of a bank of polyphase filters, each filter having a pass band corresponding to a respective one of the N frequency bins or channels. The response of the digital channelizer combined over all N channelized signals as a function of analog frequency across the entire band of the receiver is illustrated in the graph of FIG. 2. The graph of FIG. 2 is actually a superposition of the individual passband responses of the bank of filters constituting the channelizer 120. Each channel corresponds to one pass band, labelled in FIG. 2 as "1" through "N". Below about 6 dB from the peak response, each channel's response overlaps that of the adjacent channel. For those frequencies falling within this overlap, the probability of an aliasing error is high. FIG. 2B is an enlarged view of FIG. 2A showing the overlap between two adjacent channel responses. In the unshaded regions of FIG. 2B, there is no overlap and therefore little chance of aliasing error.

Referring again to FIG. 1, a parameter encoder 130 receives the output of the digital channelizer 120. In the parameter encoder 130, the N channelized output signals $X_k$ (n) of the digital channelizer 120 are processed individually by respective channel processing modules 140. A channel processing module 140 is assigned to each channelized signal, so there are N channel processing modules. Each channel processing module 140 analyzes its channelized signal and outputs a parameter digital word (PDW) specifying the value of each predetermined parameter (e.g., frequency, amplitude, time of arrival, modulation type) for the latest sample time. The outputs of the N channel processing modules 140 are multiplexed in a PDW interface 150 into a single output stream of digital words 160.

Overview of the Channel Processing Module 140

Figure 3:
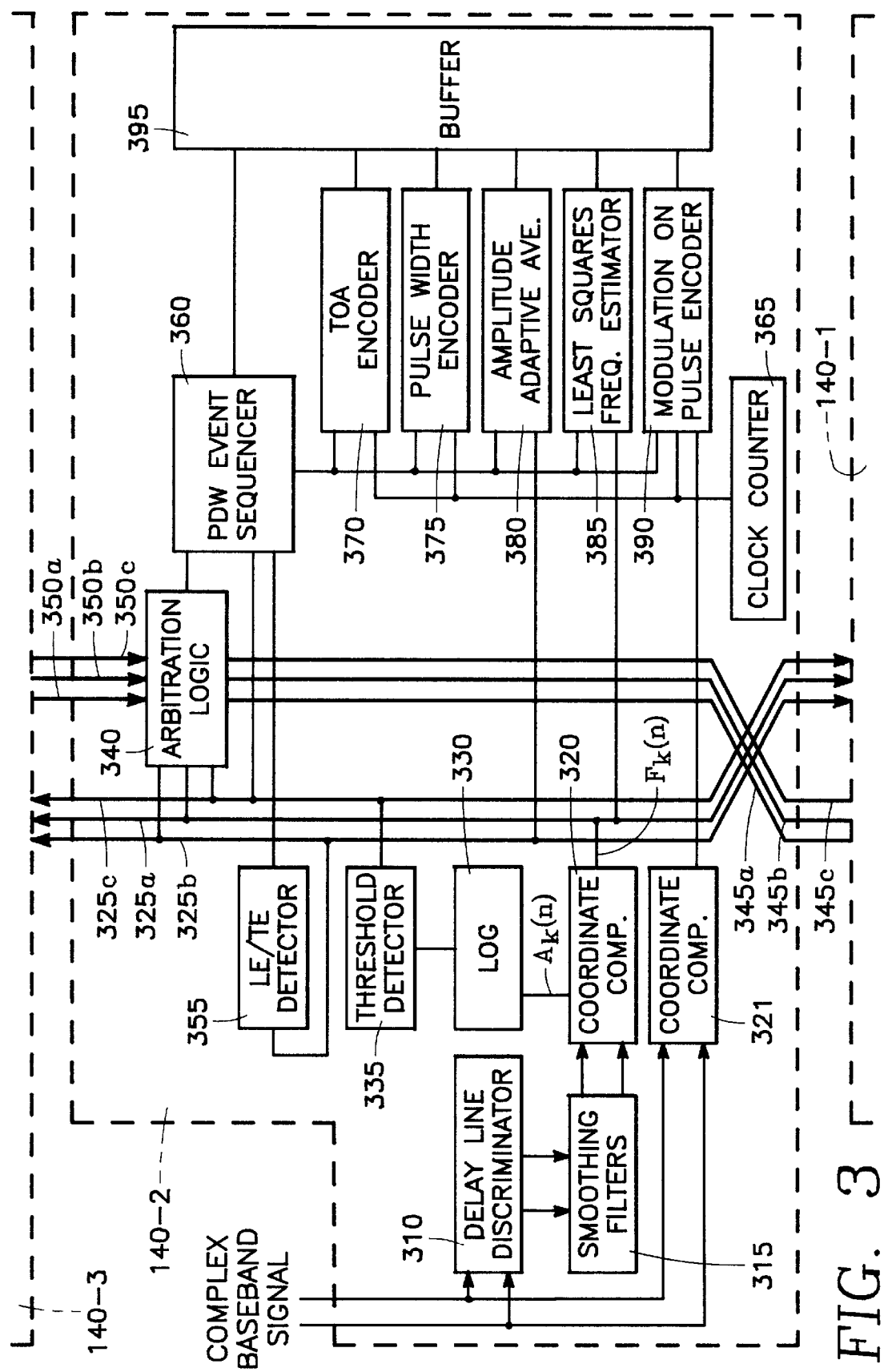
FIG. 3 is a block diagram of a preferred channel processing module embodying the invention.

FIG. 3 illustrates the internal structure of a typical channel processing module 140, which in the present example is the second channel processing module 140-2. The embodiment of FIG. 3 is particularly adapted to facilitate characterization of time of arrival, frequency and amplitude of a pulse signal, a continuous wave (CW) signal and an FM chirp pulse signal. In addition, for a pulse signal it is adapted to facilitate characterization of pulse width. Furthermore, for an FM chirp pulse signal it is further adapted to facilitate characterization of time rate of change of frequency and the start frequency of the chirp. However, the invention is not limited to processing those particular types of signals.

In FIG. 3, the real and imaginary components of the $n^{th}$ sample of a complex signal detected in the $k^{th}$ channel, $X^k$(n), are applied to respective inputs of a delay line multiplier 310. (In the example of FIG. 3, the channel index k equals 2.) The delay line multiplier 310 has two M-bit inputs (where M is the number of bits of each digitized sample), one for the real part and one for the imaginary part, and performs a multiplication in the complex plane of a signal sample $X_k$(n) by the complex conjugate of its immediate predecessor $X_k$(n−1). (The choice of which one of the two samples is to be the complex conjugated is immaterial.) The M-bit real part and M-bit imaginary part of the resulting complex product are smoothed in a pair of conventional cascaded integrated comb (CIC) smoothing filters, denoted together by the element 315 in FIG. 3, and the smoothed M-bit real part and M-bit imaginary part are processed together by a conventional coordinate rotation digital computer 320. The coordinate rotation computer transforms the representation of the complex signal $X_k$ (n) from a sum of real and imaginary components to a polar representation of the form $Ae^{i\Phi}$, where A is the amplitude, i is $(-1)^{1/2}$, and $\Phi$ is the angle in the complex plane. Such a coordinate rotation digital computer was first developed by J. E. Volder in 1959 and is well-known in the art. Generally, the $\Phi=\omega t+\phi$, where $\omega$ is the angular frequency of the sampled signal, t is time and $\phi$ is the phase of the sampled signal $X_k$(n). However, because of the frequency discrimination performed by the delay line multiplier 310, the angle $\Phi$ contains only the angular frequency of the signal multiplied by a normalized sample interval time and is independent of the phase, and therefore $\Phi$ may be equated to the angular frequency $\omega$ normalized by the sampling interval. Therefore, the combined operation of the delay line multiplier 315 and the coordinate rotation computer 320 extracts the amplitude A and frequency F of the complex signal for each sample time. Thus, what is provided are the incoming signal's Fourier transform components, frequency and amplitude, for each sample time. Hereinafter, the nth sample of the amplitude A for the kth channel is referred to as $A_k$(n) and the corresponding frequency sample is referred to as $F_k$(n), corresponding to the channelized signal $X_k$ (n).

The coordinate rotation computer 320 outputs the M-bit frequency sample $F_k$(n) on an output bus 325a and, through a log amplitude encoder 330, outputs the log of the amplitude $A_k$(n) on an M-bit output bus 325b. The effect of the log amplitude encoder 330 is analogous to data compression and is well-known in the art. A threshold detector 335 receives the M'-bit output of the log amplitude encoder 330 and produces a one-bit threshold logic signal $L_{Dk}$ on an output bus 325c comparing the amplitude $A_k$(n) with a predetermined threshold value.

Arbitration logic 340 receives the M'-bit amplitude sample $A_k$(n), the M-bit frequency sample $F_k$(n) and the threshold logic signal $L_{Dk}$ via the output busses 325a, 325b, 325c and receives the three corresponding outputs from the two adjacent channel processing modules. Specifically the arbitration logic 340 receives $A_{k-1}$(n), $F_{k-1}$(n), $L_{Dk-1}$ via input busses 345a, 345b, 345c from one neighbor and $A_{k+1}(n)$, $F_{k+1}(n)$, $L_{Dk+1}$ via input busses 350a, 350b, 350c from the other neighbor. The arbitration logic 340 arbitrates between a choice between two possible channels whenever necessary and arbitrates between frequencies whenever necessary. The arbitration logic outputs a one-bit channel arbitration logic signal $L_{CA}$ and a 3-bit frequency arbitration logic signal $F_{PDW}$.

In the remaining description, each sample, such as the real part of the signal, the imaginary part of the signal, the frequency and the amplitude are assumed to be M-bit digital words, except that the output of the log amplitude encoder 330 may be an M'-bit digital word where M' is less than M. Moreover, the logic signals mentioned below are generally single bit false/true logic signals unless otherwise specified. However, the skilled worker can implement the invention in which the number of bits may depart from the foregoing in different stages of the system without materially changing the functionality. The details given in this specification regarding the number of bits of a given variable merely facilitate a more rigorous definition of one preferred embodiment of the invention and do not apply to all possible embodiments of the invention.

A leading edge/trailing edge (LE/TE) detector 355 monitors the M'-bit amplitude sample $A_k(n)$ from the log amplitude encoder 330 outputs a one-bit logic signal (referred to herein as $L_{LE}$) signifying the arrival of a leading edge in the channelized signal and a one-bit logic signal (referred to herein as $L_{TE}$) signifying the arrival of a trailing edge in the channelized signal $X_k(n)$. A state sequencer 360 receives both logic outputs signals of the LE/TE detector 355, the logic output signal of the threshold detector 335 and the output signals of the arbitration logic 340 and processes them to produce a number of signals employed in extracting certain parameters from the signal $X_k(n)$. As will be described in greater detail below, the state sequencer 360 produces certain logic signals signifying when a leading or trailing transition of a received pulse in the channelized signal $X_k(n)$ is at certain predetermined fractions of the steady state or peak pulse amplitude.

The predetermined parameters are extracted from the signal by the following elements in response to signals from the state sequencer 360 and a count from a clock counter 365: A time of arrival encoder 370 encodes the time of arrival of a pulse detected in the signal $X_k(n)$; a pulse width encoder 375 encodes the pulse width of that pulse; an amplitude adaptive averaging circuit 380 encodes an average value of the pulse's amplitude; a least squares estimator 385 encodes an estimate of the frequency; and a modulation on pulse encoder 390 classifies the type of modulation (if any) present in the detected pulse. A FIFO data buffer 395 multiplexes the outputs of the various encoders 370, 375, 380, 385, 390 into a single data stream.

Delay Line Multiplier 310:

Referring to FIG. 4, the delay-line multiplier 310 includes a one-sample-time delay line element 410 which delays in parallel the real and imaginary components of the signal $X_k(n)$. A complex conjugate multiplier 420 performs a function well-known in the art, namely the multiplication of one complex number by the complex conjugate of another complex number. As understood in this specification, a complex number is a number consisting of two components, a real component and an imaginary component. One input to the multiplier 420 is the output of the delay line element 410, namely the real and imaginary components of $X_k(n-1)$, while the other input to the multiplier 420 is the undelayed signal sample $X_k(n)$.

Threshold Detector 325:

Referring to FIG. 5, the threshold detector 325 includes a conventional level comparator 510 having a pair of differential inputs labelled + and − and an output for a logic signal $L_{Dk}$. The comparator's + input receives the log amplitude $A_k(n)$ from the log encoder 330 while the comparator's − (negative) input receives one of two thresholds $V_{T1}$, $V_{T2}$ determined by a switch 520. The switch 520 selects one of the two thresholds in accordance with the logic level applied to its control input 520a from the output of the comparator 510. The switch 520 selects the higher threshold $V_{T1}$ as long as the output logic signal $L_{Dk}$ indicates that the amplitude $A_k(n)$ is below the threshold applied to the comparators − input, and selects the lower threshold $V_{T2}$ otherwise. FIG. 6 illustrates how the threshold detector 325 functions: The leading edge of a received pulse requires a higher threshold to raise the detector output while the trailing edge must fall below a lower threshold before the detector output returns to logic null. An advantage is that a received pulse can fall below its initial amplitude after occurrence of the leading edge (as suggested by the dashed line in FIG. 6) and still be detected for its entire width. Typically, for noisy pulses, both the leading and trailing edges are characterized by spikes, while the pulse amplitude can be depressed between the leading and trailing edges. As shown in FIG. 6, the higher threshold $V_{T1}$ is preferably about ⅔ of the anticipated peak amplitude of a typical pulse while the lower threshold $V_{T2}$ is preferably about ⅓ of the anticipated peak amplitude.

Leading and Trailing Edge Detector 355:

Referring to FIG. 7, the LE/TE detector 355 triggers a logic signal $L_{LE}$ upon the occurrence of a leading edge of a detected pulse in the channelized signal $X_k(n)$ and triggers another logic signal $L_{TE}$ upon occurrence of the trailing edge. In the preferred embodiment, the time of the leading edge is defined as the time at which the leading edge of a once-delayed version of the pulse coincides in amplitude with the leading edge of an undelayed attenuated version of the pulse. Similarly, the time of the trailing edge is preferably defined as the time at which the trailing edge of the pulse coincides in amplitude with the trailing edge of a twice-delayed attenuated version of the pulse. The one delay interval (D) is predetermined as slightly exceeding the typical rise-time of a suitable range of anticipated pulses. The twice delay interval (2D) is simply twice that time. In both cases, the attenuation is preferably by a factor of two. In FIG. 7, an implementation of this function delays the amplitude signal $A_k(n)$ in two successive delay lines 710, 720 so that three amplitude signals are simultaneously available: $A_k(n)$, $A_k(n-1D)$ and $A_k(n-2D)$. The first and last signals $A_k(n)$, $A_k(n-2D)$ are attenuated by a factor of two by attenuators 730, 740 and the comparators 750, 760 compare the middle signal $A_k(n-1D)$ with respective ones of the first and last signals $A_k(n)$, $A_k(n-2D)$. The output of the comparator 750 (the comparison between the middle and first signals) triggers the leading edge logic signal $L_{LE}(n)$ whenever the two inputs are at least nearly equal, while the output of the comparator 760 (the comparison between the middle and last signals) triggers the trailing edge logic signal $L_{TE}(n)$ whenever the two inputs reach at least near equality.

Arbitration Logic 340:

The arbitration logic 340 may be implemented in any suitable fashion with conventional logic elements and is best defined by its truth table which can be implemented in any suitable manner by the skilled worker. The arbitration logic performs both channel arbitration and frequency arbitration, as necessary. Channel arbitration and frequency arbitration may be necessary where the frequency of a signal lies close to the frequency boundary between adjacent frequency bins or channels.

Channel Arbitration:

The preferred embodiment of the channel arbitration logic and function of the arbitration logic 340 is defined in the truth table of FIG. 8. Channel arbitration is necessary to resolve ambiguities which occur when signals are detected in adjacent channels due to finite channel filter skirt response. The arbitration logic 340 asserts present channel (i.e., channel k) by raising a logic output $L_{CA}$ as the valid channel of a detected pulse or signal whenever any of the eight logic test conditions defined in the truth table of FIG. 8 obtains, as follows:

(1) The first logic test condition (the column labelled $P_1$ in the truth table of FIG. 8) obtains whenever the amplitude of the present channel (channel k) exceeds the threshold $V_{T2}$ while neither of the amplitudes of its neighbor channels (channels k+1 and k−1) exceed that threshold. This is probably the least ambiguous condition for the choice of the kth channel as containing the detected pulse.

(2) The second logic test condition (the column labelled $P_2$ in the truth table of FIG. 8) obtains whenever the amplitude of the present channel (channel k) and that of its neighbor (channel k+1) each exceeds the threshold $V_{T2}$ while the amplitude of the other neighbor channel k−1 does not exceed that threshold (so that the k and k+1 channels are candidates), and the amplitude of the present channel exceeds that of the neighbor k+1 (thus favoring the k channel over the k+1 channel as the likliest choice).

(3) The third logic test condition (the column labelled $P_3$ in the truth table of FIG. 8) is equivalent to the second test condition with the role of the two neighbor channels reversed. This condition obtains whenever the amplitude of the present channel (channel k) and that of its neighbor (channel k−1) each exceeds the threshold $V_{T2}$ while the amplitude of the other neighbor channel k+1 does not exceed that threshold, and the amplitude of the present channel exceeds that of the neighbor k−1.

(4) The fourth logic test condition (the column labelled $P_4$ in the truth table of FIG. 8) obtains whenever the amplitudes of the three channel (channels k−1, k and k+1) each exceeds the threshold $V_{T2}$ and the amplitude of the present channel (channel k) exceeds that of both its neighbors (channels k−1and k+1).

(5) The fifth logic test condition (the column labelled $P_5$ in the truth table of FIG. 8) corresponds to the case where a valid pulse occurs each one of the adjacent channels k and k+1. This condition obtains whenever the amplitude of the present channel (channel k) and that of its neighbor (channel k+1) each exceeds the threshold $V_{T2}$ while the amplitude of the other neighbor channel k−1does not exceed that threshold (so that the k and k+1 channels are candidates), the amplitude of the present channel does not exceed that of the neighbor k+1 (thus not favoring the k channel over the k+1 channel as the likliest choice), and the frequency detected in the k+1 neighbor channel (i.e., $F_{k+1}$) differs from the frequency detected in channel k (i.e., $F_k$) by more than a certain threshold. This latter condition would indicate that the present of strong amplitudes in the two adjacent channels is not due to aliasing. The frequency difference threshold is typically a percentage of the filter or frequency bin width, for example about 10%.

(6) The sixth logic test condition (the column labelled $P_6$ in the truth table of FIG. 8) corresponds to the case of the fifth logic conditions with the roles of the neighbor channels k+1 and k−1 reversed.

(7) The seventh logic test condition (the column labelled $P_7$ in the truth table of FIG. 8) is a hybrid in which the requirements of the fourth test condition are met with respect to one of the neighbors (the k+1 channel) while the requirements of the fifth condition are met with respect to the other neighbor (the k−1 channel).

(8) The eighth logic test condition (the column labelled $P_8$ in the truth table of FIG. 8) is equivalent to the seventh condition with the roles of the neighbor channels k+1, k−1reversed.

(9) The ninth logic test condition (the column labelled $P_9$ in the truth table of FIG. 8) corresponds to the case in which valid pulses occur concurrently in each of the three neighboring channels. This condition is met whenever all three channel amplitudes exceed the threshold, the present channel's amplitude (channel k) does not exceed those of its two neighbors (channels k−1 and k+1)—so that the fourth test condition cannot be used—and the detected frequencies in each neighbor channel i.e., $F_{k-1}$ and $F_{k+1}$) differ from the frequency detected in the present channel ($F_k$) by more than a certain threshold. This threshold is typically a percentage of the filter or frequency bin width, for example about 10%.

If any one of the nine foregoing logic test conditions is met, then the arbitration logic 340 raises its logic output bit $L_{CA}$, which asserts the present channel (channel k) as containing a valid pulse. Otherwise, the logic output bit $L_{CA}$ is not raised.

Frequency Arbitration:

Frequency arbitration is necessary to resolve frequency measurement ambiguities arising from the sample rate decimation and spectral folding which occurs in the digital channelizer. Such a correction moves a frequency aliased at one edge of the filter band to the opposite edge. The frequency is corrected by either adding or subtracting a frequency corresponding to the channel bandwidth, depending upon the location of the detected frequency. FIG. 9 illustrates the truth table defining the logical function of the frequency arbitration. There are three possible outcomes: (a) the frequency does not require correction, (b) one channel bandwidth is added to the detected frequency, (c) one channel bandwidth is subtracted from the detected frequency. This outcome can be unambiguously specified by three logic bits. Alternatively, the output can simply be an entire byte representing the corrected frequency. There are two test cases in the truth table of FIG. 9 in which the frequency is corrected, corresponding to the columns labelled $P_1$ and $P_2$. These test cases make use of two defined quantities, namely $F_{LO}$ and $F_{HI}$, which are, respectively, the lowest and highest frequencies of the channel for which the filter response has not rolled off below a predetermined amount (e.g., zero). FIG. 2 illustrates examples of the locations of $F_{LO}$ and $F_{HI}$ in a channel frequency band.

In the first test case ($P_1$), the detected frequency is not below $F_{LO}$ but is above $F_{HI}$, the amplitudes of both adjacent channels (the k−1and k+1 channels) are above a threshold (such as $V_{T2}$) and the amplitude in channel k−1 exceeds that of channel k+1. In this case, it appears that the frequency has been aliased from the lower edge to the upper edge of the channel band, and therefore one channel bandwidth is subtracted from the detected frequency to bring it back to near the lower edge of the channel band.

In the second test case ($P_2$), the detected frequency is below $F_{LO}$ and (therefore) is not above $F_{HI}$, the amplitudes of both adjacent channels (the k−1and k+1 channels) are above a threshold (such as $V_{T2}$) and the amplitude in channel k+1 equals or exceeds that of channel k−1. In this case, it appears that the frequency has been aliased from the upper edge to the lower edge of the channel band, and therefore one channel bandwidth is added to the detected frequency to bring it back to near the upper edge of the channel band.

If neither of these two test cases is met, then no correction is made to the detected frequency.

The skilled worker can readily construct a logic circuit implementing the truth tables of FIGS. 8 and 9 and the invention is independent of any particular logical circuit implementation of these functions, and therefore no such implementations are discussed herein.

Figure 10:
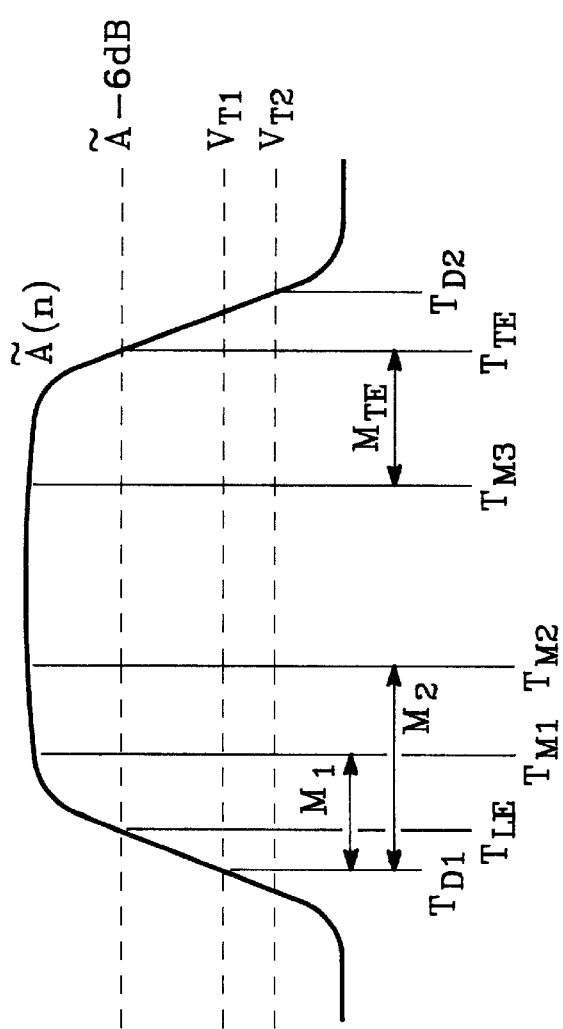
FIG. 10 illustrates the time domain waveform of an incoming pulse and defines several key events and time intervals controlling the state sequencer in the channel processing module of FIG. 3.

State Sequencer 360:

The state sequencer 360 responds to the occurrence of certain events which are illustrated in FIG. 10. FIG. 10 illustrates the time domain waveform of a typical pulse detected in the channelized signal. The first event occurs at time $T_{D1}$ when the pulse amplitude reaches the value of the higher threshold $V_{T1}$ of the threshold detector. This event is signaled by the transition of the threshold detector logic output $L_D$ from a logic zero to logic one. The next event occurs at time $T_{LE}$, when the LE/TE detector 355 detects the leading edge of the pulse. This event is signified by the transition of the leading edge logic signal $L_{LE}$ of the LE/TE detector from logic zero to logic one. Next, the pulse reaches 95% of its peak amplitude at time $T_{M1}$, which is signified by the transition of a logic signal $L_{M1}$ produced by the arbitration logic 340 from zero to logic one. Then, the pulse reaches 99% of its peak amplitude at time $T_{M2}$, which is signified by a transition of a logic signal $L_{M2}$ from zero to logic one. This logic signal controls the sequencing of the parameter encoder, the least squares frequency estimator and the amplitude averager. The time interval between $T_{M1}$ and $T_{D1}$ is $M_1$ and the time interval between $T_{M2}$ and $T_{D1}$ is $M_2$.

While the foregoing events occur near the leading edge, the remaining events occur near the trailing edge. At time $T_{M3}$ the pulse amplitude falls below 95% of its peak value. At time $T_{TE}$ the LE/TE detector detects a trailing edge, so that the logic signal output by the LE/TE detector transitions from zero to logic one. The time interval between time $T_{M3}$ and time $T_{TE}$ is $M_{TE}$. The last event occurs at time $T_{D2}$ when the amplitude falls below the lower threshold $V_{T2}$, which causes the logic signal $L_D$ to transition from logic one to zero.

Figure 11:
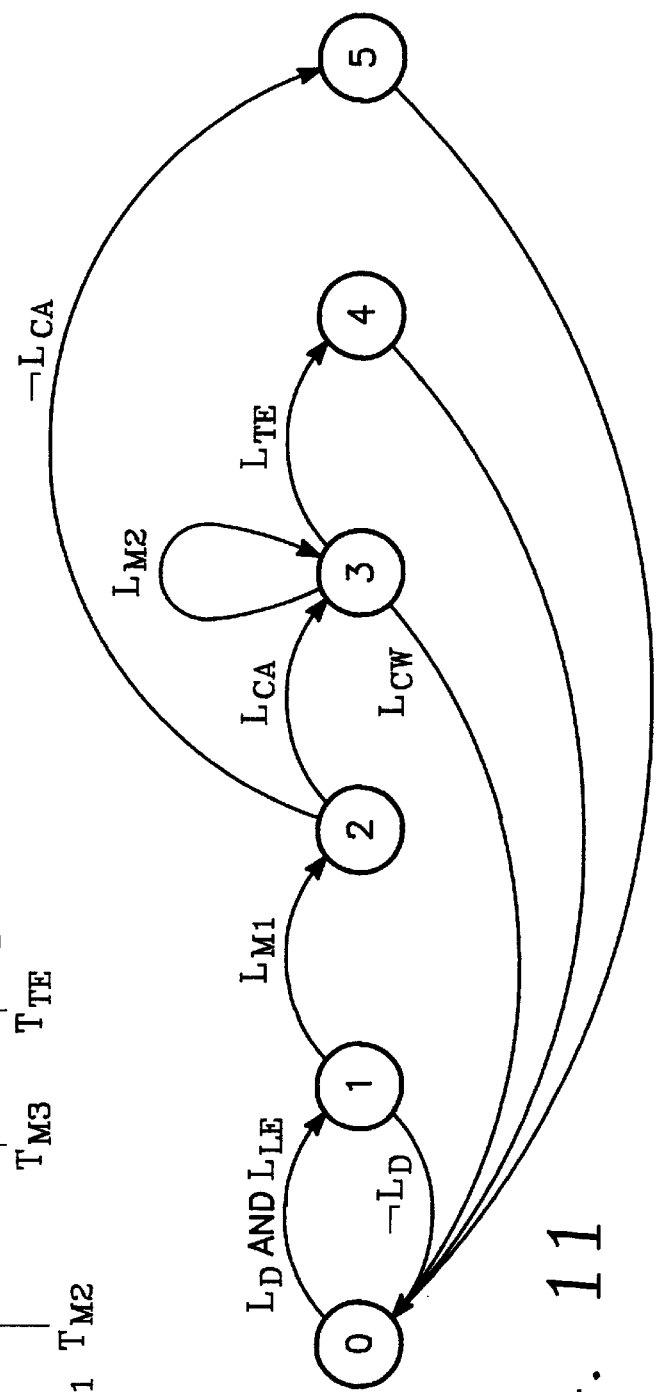
FIG. 11 is a state transition diagram illustrating the operation of the state sequencer in the channel processing module of FIG. 3.

Referring to FIG. 11, the sequence of states by the state sequencer 360 characterizes the transitions of certain logic signals. Specifically, the transitions of the logic signals $L_D$ and $L_{LE}$ are the transition of the system from the quiescent ground state 0 to state 1. In state 1, the system strobes the clock signal to mark the pulse time of arrival and the beginning of pulse (as discussed below in this specification), and initiates timers for $T_{M1}$ and $T_{M2}$. The transition of the logic signal $L_{M2}$ is the transition of the system from state 1 to state 2. In state 2, the system activates the channel arbitration logic function of the arbitration logic 340 and measures the amplitude and frequency. The transition of the logic signal $L_{CA}$ to a true logic level is the transition from state 2 to state 3. Failure of the $L_{CA}$ logic signal to transition to the true logic level indicates that the detected pulse is not in the present channel, and the system jumps instead to state 5, whence it returns to state 0. Otherwise, the logic signal $L_{M2}$ transitions during state 3. In state 3, amplitude and frequency measurements are made. At the end of the detected pulse, the logic signal $L_{TE}$ transitions to a logic one while the logic signal $L_D$ returns to a logic zero, these transitions carrying the system from state 3 to state 4. However, if there is no end-of-pulse before a predetermined timer interval (equal to at least the longest anticipated valid pulse width), then the sequencer 360 triggers a logic signal $L_{CW}$, indicating that the received signal probably is not a pulse train but rather a continuous wave (CW) signal, in which case the system returns to the ground state (state 0). On the other hand, if the system reaches state 4, the clock is strobed to mark the end of pulse, and the transfer of the parameter digital work is initiated. The system then returns to the ground state, state 0.

The logic signals mentioned above not produced by other components are produced by the state sequencer 360 in accordance with the foregoing using conventional techniques including well-known logic functions.

Figure 12:
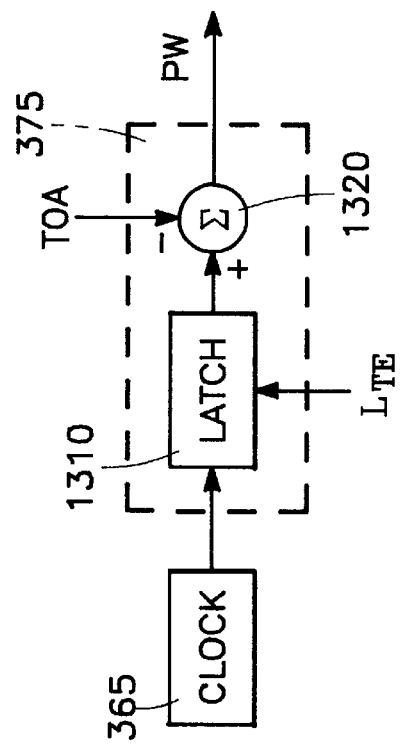
FIG. 12 is a block diagram of a time of arrival encoder in the channel processing module of FIG. 3.

Time of Arrival Encoder 370:

Referring to FIG. 12, the time of arrival encoder 370 consists of a latch 1210. The latch 1201 has a data input connected to the clock 365, a latch control input connected to the logic signal $L_{LE}$ from the LE/TE detector 355, and a data output which provides the time of arrival for the pulse detected by the LE/TE detector. Whenever the leading edge logic signal $L_{LE}$ becomes true, the current value of the clock signal is latched at the output of the time of arrival encoder 370.

Figure 13:
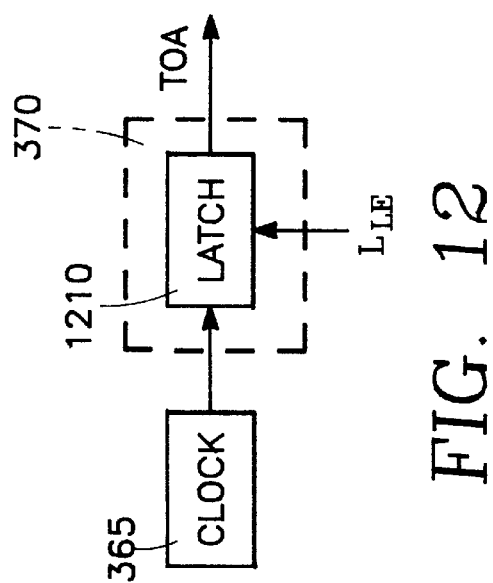
FIG. 13 is a block diagram of a pulse width encoder in the channel processing module of FIG. 3.

Pulse Width Encoder 375:

Referring to FIG. 13, the pulse width encoder 375 consists of a latch 1310 and a subtractor 1320. The data input to the latch receives the clock signal from the clock 365 while the data output of the latch 1310 is applied to a positive input of the subtractor 1320. The latch 1310 has a latch control input connected to the trailing logic signal $L_{TE}$ from the LE/TE detector 355. The subtractor 1320 has a negative input connected to receive the time of arrival from the output of the time of arrival encoder 365. The subtractor 1320 subtracts the time of arrival from the value of the clock signal latched at the time of the trailing edge from the time of arrival received from the time of arrival encoder 365. The difference is the pulse width, and is output from the pulse width encoder 375.

Figure 14:
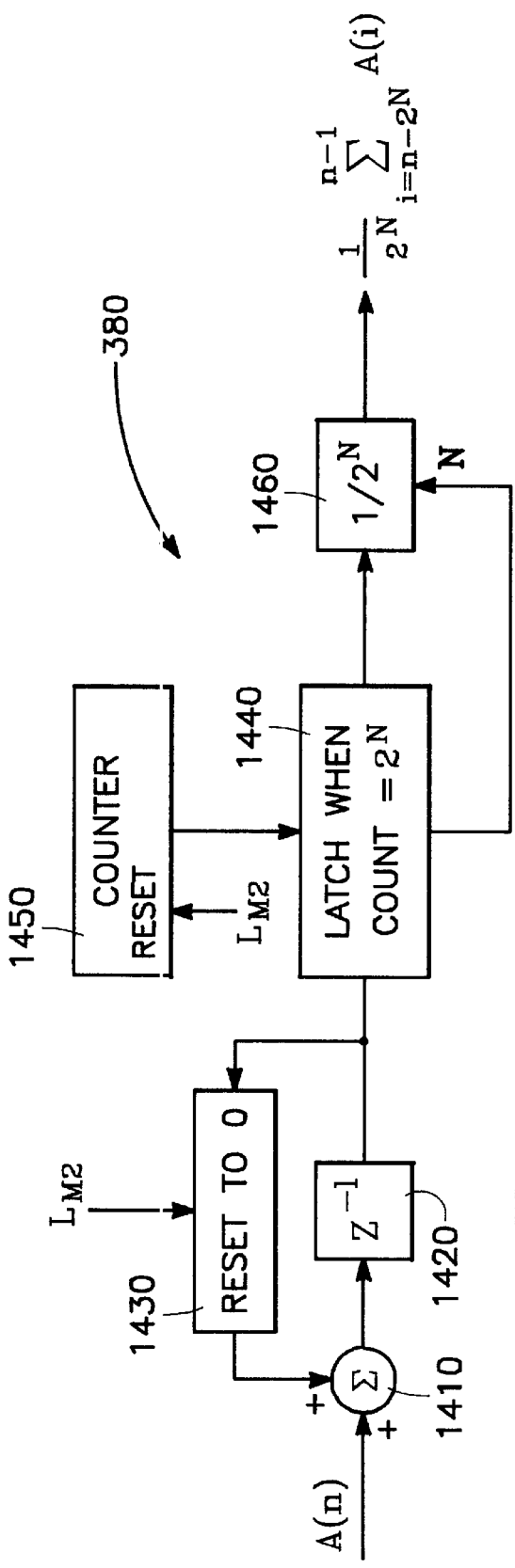
FIG. 14 is a block diagram of a preferred amplitude averager in the channel processing module of FIG. 3.

Adaptive Averaging Circuit 380:

Referring to FIG. 14, the amplitude adaptive averaging circuit receives from the log amplitude encoder 330 a signal amplitude A(n) at each sample time n. An adder 1410 has one input connected to receive the succession of A(n)'s. The output of the adder 1410 is delayed one sample time by a delay element 1420. The output of the delay element 1420 is applied as feedback to other input of the adder 1410 through a buffer 1430, so that a cumulative sum may be computed. The buffer 1430 is controlled by the logic signal $L_{M2}$ from the sequencer 360 to reset the feedback to zero with each transition of the logic signal $L_{M2}$ to a true logic value. Thus, the summation carried out with the adder 1410 begins only after the amplitude values have reached 95% of the peak value. A latch 1440 latches the delayed sum from the delay element 1420 counter 1450 each time the output from a counter 1450 reaches a power of 2. The counter 1450 is reset by the logic signal $L_{M2}$ so as to be synchronized with the operation of the summing loop 1410, 1420, 1430. In operation, the latch 1440 is a logic circuit that is set to a power of 2, namely $2^N$, where N is an integer, and the latch waits until the output from the counter 1450 reaches $2^N$, at which time it latches at its output the delayed sum from the delay element 1420. The latch 1440 then updates N to the next highest integer value and repeats the operation. Each current value of N is output by the latch 1440 to a divide-by-$2^N$ circuit 1460, which divides the latched sum value by $2^N$, and provides the result at the output of the adaptive averaging circuit 380. The result is a sum over $2^N$ samples of the amplitude divided by $2^N$, which is the average value desired.

The main advantage of the averaging circuit 380 is that it attempts to compute an average amplitude only when the number of available amplitude samples reaches a power of two ($2^N$) thereby making the divide-by-$2^N$ operation a simple binary shift, so that no floating point arithmetic is necessary.

Figure 15:
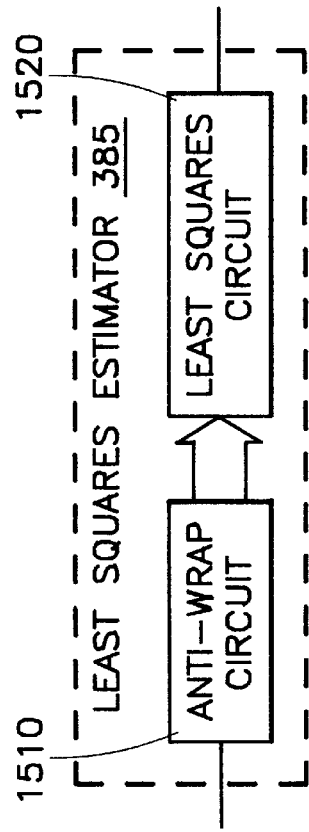
FIG. 15 is a top-level block diagram of a least squares frequency estimator in the channel processing module of FIG. 3.

Least Squares Frequency Estimator 385:

Referring to FIG. 15, the frequency estimator 385 includes an anti-wrap circuit 1510 which processes the incoming polar coordinate or frequency-containing signal $\omega t+\phi$ (where $\omega$ is the angular frequency and $\phi$ is the phase) from the coordinate rotation computer 320. The frequency estimator further includes a least squares circuit 1520 connected to the output of the anti-wrap circuit 1510. The frequency containing signal ($\omega t+\phi$) can cause aliasing when ($\omega t+\phi$) is near $\pm\pi$, giving rise to instability. The anti-wrap circuit 1510 removes such instability.

Figure 16:
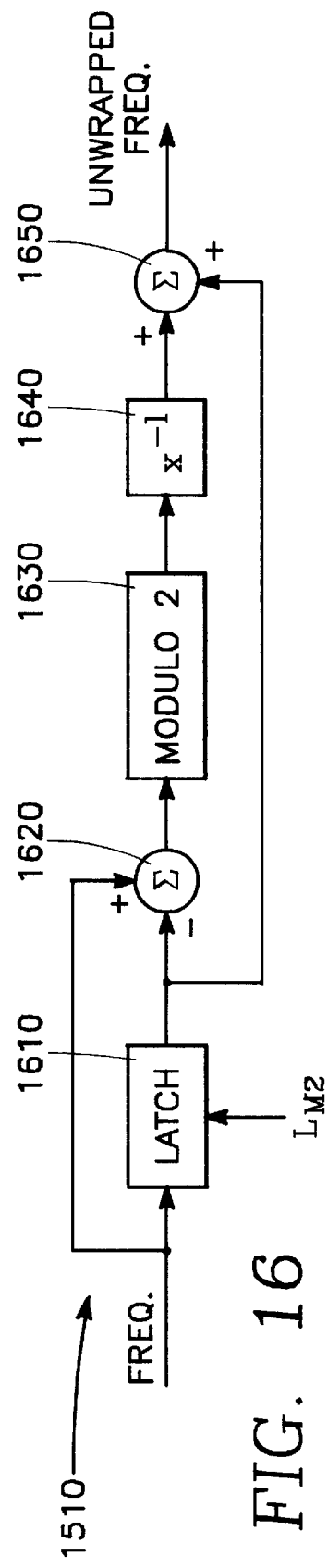
FIG. 16 is a block diagram of an anti-wrap circuit of the least squares frequency estimator of FIG. 15.

Referring to FIG. 16, the anti-wrap circuit 1510 consists of a latch 1610 which latches the incoming frequency-containing signal each time the logic signal $L_{M2}$ is true (i.e., when an incoming pulse reaches 95% of its peak value), and applies the latched signal to the negative input of a subtractor 1620. The unlatched frequency-containing signal is applied to the positive input of the subtractor 1620. The subtraction of successive samples of the frequency-containing signal $\omega t+\phi$ eliminates the relatively constant phase $\phi$, leaving only successive samples of the frequency $\omega$, and thereby performs delay line discrimination of the frequency. The output of the subtractor 1620 is reduced modulo 2 by a modulo 2 circuit 1630 whose output is applied through a one-sample delay element 1640 to one input of an adder 1650. The other input of the adder 1650 receives the latched frequency-containing signal from the latch 1610. The output of the adder 1650 is a signal which is a function of successive samples of the unwrapped frequency, and is applied to the input of the least squares circuit 1520.

Figure 17:
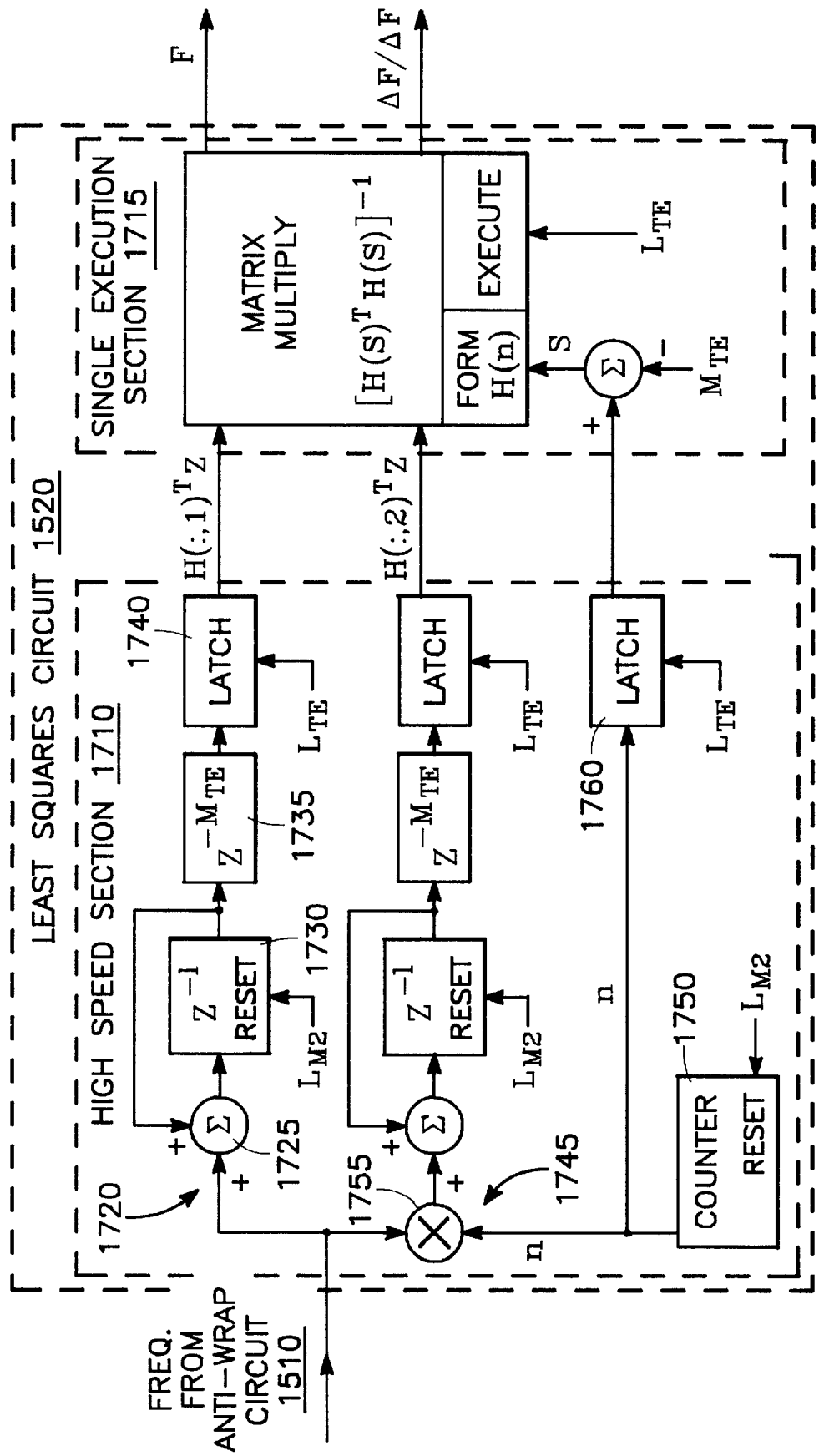
FIG. 17 is a block diagram of a least squares circuit of the least squares frequency estimator of FIG. 15.

Least Squares Circuit 1520:

Referring to FIG. 17, the least squares circuit 1520 consists of a high speed section 1710 and a single execution section 1715. The implementation of FIG. 17 is particularly adapted to estimating the frequency of an FM chirp pulse signal. In the case of an FM chirp, the subtraction performed by the discriminator section 1610, 1620 of FIG. 16 yields the following discriminated frequency z(k) for the kth sample (ignoring noise terms):

$$z(n)=F_0T+(dF/dt)/2+(dF/dt)T^2n^2/2 \quad (1)$$

where $F_0$ is the starting frequency of the FM chirp, dF the rate of change of the frequency during the FM chirp, T is the sample interval, or the reciprocal of the sampling rate and n is the sample index. If there are S successive samples of a given pulse to be processed, then z(k) may be represented as an S-element column vector whose elements are each of the z(n) in descending order of sample number n. In this case, the right side of the foregoing equation is of the form Hx, where H is a 2-by-S matrix and x is a 2-element column vector as follows:

$$x = \begin{vmatrix} T & -T^2/2 \\ 0 & T \end{vmatrix} \begin{vmatrix} F_0 \\ dF/dt \end{vmatrix} \quad (2)$$

$$H = \begin{vmatrix} 1 & 1 \\ 1 & 2 \\ 1 & 3 \\ . & . \\ . & . \\ . & . \\ 1 & S \end{vmatrix} \quad (3)$$

In accordance with conventional techniques, an estimate $z_{LS}$ of z over the S samples which minimizes the squares of the deviations between the estimate and the true (but a priori unknown) values for the n samples is obtained by performing the following operation:

$$z_{LS_f} = (H^TH)^{-1}H^Tz \quad (4)$$

where the superscript denotes a transpose and the superscript $^{-1}$ denotes an inverse. The term $H^Tz$ is a 2-element vector which may be expressed as follows:

$$H^Tz = \begin{vmatrix} \Sigma z(n) \\ \Sigma nz(n) \end{vmatrix} \quad (5)$$

The term $(H^TH)^{-1}$ is a 2-by-2 matrix whose elements are functions of the number of samples n as follows:

$$(H^TH)^{-1} = [1/(S(S-1))] \begin{vmatrix} 2(2S+1) & -6 \\ -6 & 12(2S+1) \end{vmatrix} \quad (6)$$

Thus, the least squares estimate of z over S samples is as follows:

$$z_{LS} = [1/(S(S-1))] \begin{vmatrix} 2(2S+1) & -6 \\ -6 & 12(2S+1) \end{vmatrix} \begin{vmatrix} \Sigma z(n) \\ \Sigma nz(n) \end{vmatrix} \quad (7)$$

where the symbol $\Sigma$ denotes a summation over the index n from 1 to S.

The circuit of FIG. 17 performs the operation of the right side of the foregoing equation in synchronism with the logic sequence signals from the state sequencer 360, as will now be described. The high speed section 1710 of FIG. 17 forms the 2-element vector of Equation (5) and the single execution section 1715 forms the matrix operator of Equation (6) and then performs the matrix multiply operation of Equation (7).

The term $\Sigma z(n)$ (the top element of the 2-element vector defined by Equation (5)) is computed in the high speed section 1710 by a first branch 1720 consisting of an adder 1725 having one input receiving the frequency sample $F_k(n)$ (corresponding to z(n) of Equations 5–7), a one sample time delay 1730 connected between the output of the adder 1725 and the other input of the adder 1725, a delay 1735 of the time duration $M_{TE}$ (defined in FIG. 10 and output by the state sequencer 360) connected between the output of the delay 1730 and a latch 1740. The loop formed by the adder 1725 and the delay element 1730 performs the summation operation $\Sigma z(n)$. The contents of the one-sample time delay or buffer 1730 is initialized to zero by the logic signal $L_{M2}$ (i.e., when the pulse amplitude first reaches 99% of its peak amplitude) to begin the summing process. The summing process is terminated by the latch 1740 latching the delayed sum with the logic signal $L_{TE}$ (i.e., at the end of the pulse). The delay of $M_{TE}$ imposed by the delay element 1735 stores the samples before the trailing edge of the pulse so that the sum is not distorted by the trailing edge. The output of the latch 1740 is the term $\Sigma z(n)$ of Equation (5).

The term $\Sigma nz(n)$ (the bottom element of the 2-element vector defined by Equation (5)) is computed in the high speed section 1710 by a second branch 1745 similar to the first branch 1720 and consisting of an adder 1725' having one input receiving the frequency sample $F_k(n)$ (i.e., z(n) of Equations 5–7) multiplied by n (by a multiplier 1750), where n is the output of a counter 1755. The second branch 1745 further includes a one sample time delay 1730' is connected between the output of the adder 1725' and the other input of the adder 1725', a delay 1735' of the time duration $M_{TE}$ (defined in FIG. 10 and output by the state sequencer 360) connected between the output of the delay 1730' and a latch 1740'. The multiplier 1750 multiplies each frequency sample z(n) by the output of a counter 1755, and the product is applied to an input of the adder 1725'. The counter 1755 is initialized by the logic signal $L_{M2}$ to synchronize the sample index n from the counter 1755 with the summation process $\Sigma nz(n)$ performed by the loop consisting of the adder 1725' and the delay element 1730'. The contents of the one-sample time delay or buffer 1730' is initialized to zero by the logic signal $L_{M2}$ (i.e., when the pulse amplitude first reaches 99%. of its peak amplitude) to begin the summing process. The summing process is terminated by the latch 1740' latching the delayed sum with the logic signal $L_{TE}$(i.e., at the end of the pulse). The delay of $M_{TE}$ imposed by the delay element 1735' stores the samples before the trailing edge of the pulse so that the sum is not distorted by the trailing edge. The output of the latch 1740' is the term $\Sigma nz(n)$ of Equation (5).

In forming the matrix operator of Equation (6), the single execution section 1715 must first know the value of S (i.e., the number of samples over which the summations $\Sigma z(n)$ and $\Sigma nz(n)$ were carried out by the top and bottom branches 1720, 1745 of the high speed section 1710). The value of S is obtained by a latch 1760 which latches the output of the counter 1750 simultaneously with the latches 1740, 1740' by the logic signal $L_{TE}$ at the pulse trailing edge. In addition, a subtractor subtracts the time delay $M_{TE}$ from the output of the latch 1760, this subtraction corresponding to the time delays 1735, 1735' of the two branches. The difference is the value of S and is applied to one input of the high speed section 1715. The high speed section 1715 substitutes this value of S into Equation (6) to generate the matrix operator of Equation (6). Then upon the transition (to true) of the logic signal $L_{TE}$ (i.e., upon completion of the summation processes in the high speed section 1710), the single execution section 1715 multiplies the matrix operator of Equation (6) by the vector of Equation (5) to produce the two-element vector defined by Equation (7). The top element of the vector is the least squares estimate of the frequency while the bottom element of the vector is the least squares estimate of the time rate of change of the frequency dF/dt. If the received pulse has no FM modulation or chirp, then this second vector element is zero.

Modulation on Pulse Encoder 390:

The modulation on pulse encoder 390 plays a major role in the characterization of the modulation present in the received signal. The types of modulation which the invention can identify include frequency modulation (FM), phase modulation and FM chirp. An FM chirp is a pulse containing a constantly changing frequency. The modulation pulse encoder 390 distinguishes between phase modulation and frequency modulation based upon the length of "chips" in the frequency of the received signal. A chip in a frequency versus time graph of the signal is analogous to a pulse in an amplitude versus time graph of the signal. A signal predominantly characterized by relatively short chips contains phase modulation, while a signal with relatively long duration chips is either FM or FM chirp. The dF/dt term output by the estimator 1520 differentiates between FM and FM chirp.

Figure 18:
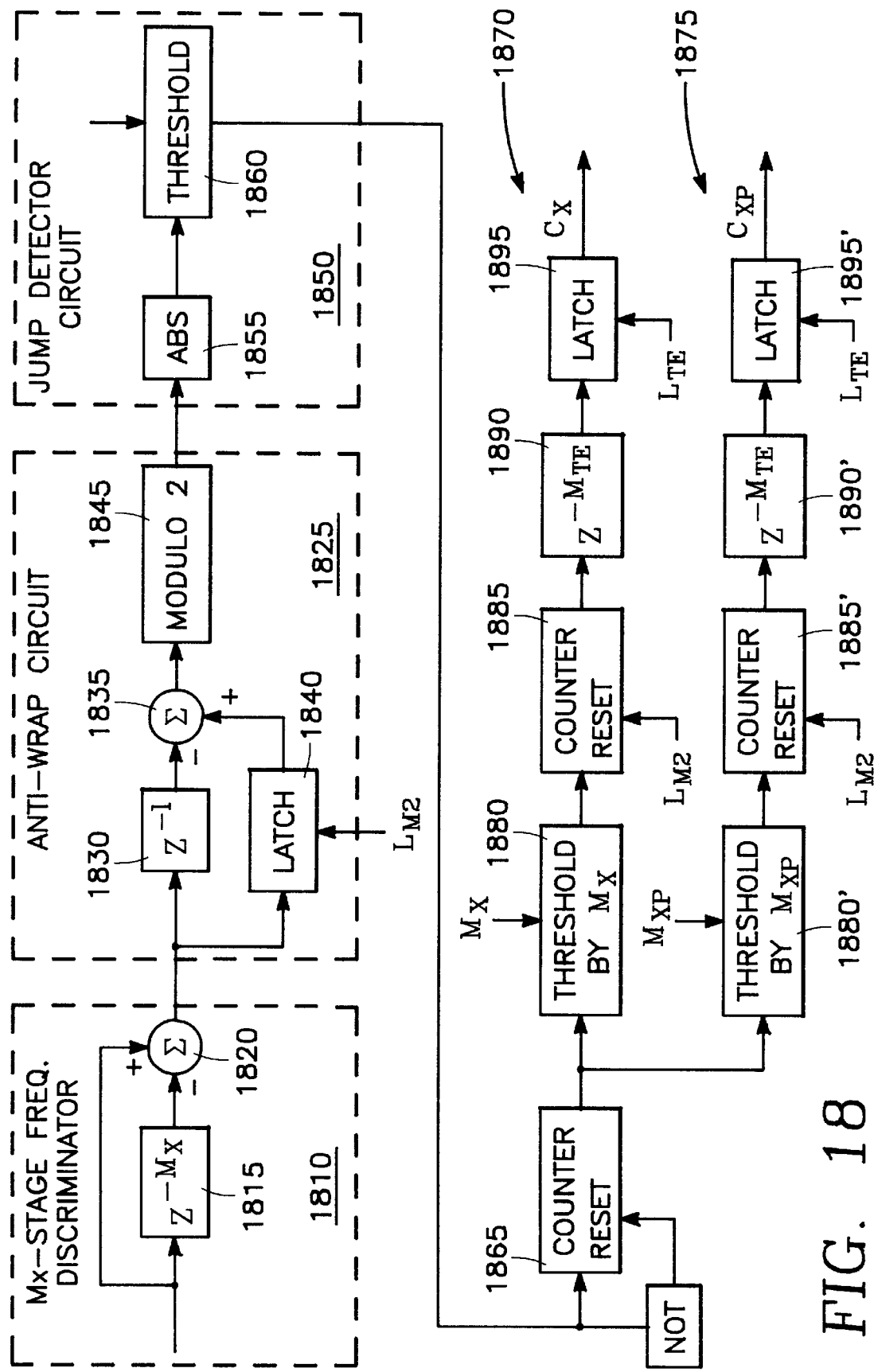
FIG. 18 is a block diagram of a modulation on pulse identifier in the channel processing module of FIG. 3.

FIG. 18 illustrates the preferred embodiment of the modulation on pulse encoder 390. In order to carry out the foregoing discrimination between frequency modulation (FM), FM chirp and phase modulation, the frequency information is extracted by a delay line frequency discriminator 1810 consisting of a delay element 1815 and a subtractor 1820. The input to the frequency discriminator 1810 preferably is the angle polar coordinate ($\Phi$) output of a coordinate transform computer 321 identical to the coordinate transform computer 320 discussed above with reference to FIG. 3. However, the real and imaginary inputs to the transform computer 321 is the channelized signal real and imaginary parts unprocessed by the multiplier 310 and unprocessed by the smoothing filter 315.

One input of the subtractor 1820 receives the current signal sample while the other receives a signal sample delayed by a delay time Mx. Mx is the shortest time duration of a chip that would signify phase modulation in a frequency range of interest, and is best determined by the user for a particular application. The output of the subtractor 1820 provides the frequency of the received signal. Preferably, an anti-wrap circuit 1825 is provided at the output of the discriminator 1810 in order to reduce or eliminate instabilities in the frequency samples output by the discriminator 1810. An anti-wrap circuit is described above in this specification with reference to FIG. 16, and the anti-wrap circuit 1825 of FIG. 18 has some of the elements of the anti-wrap circuit of FIG. 16. The anti-wrap circuit 1825 of FIG. 18 includes a one-sample time delay element 1830 which delays the frequency sample applied to the negative input of a subtractor 1835. A latch 1840 latches the frequency sample at the time of the logic signal $L_{M2}$ (i.e., when the pulse first stabilizes near 99% of its peak value). The subtractor 1835 outputs the difference between this initial "stable" sample and each successive sample. Assuming that the sample frequency is an angular frequency in radians normalized to $\rho$ and one sample time period, frequency wrapping can occur as the frequency changes by a factor of 2. Therefore, reducing the output of the subtractor 1835 by a modulo 2 element 1845 prevents frequency wrapping.

A jump detector circuit 1850 has a conventional absolute value circuit 1855 which computes the absolute value the difference value output by the anti-wrap circuit 1825 and a threshold circuit which outputs a logic signal which is true during each sample time that the absolute value output of the absolute value circuit jumps by a predetermined amount (e.g., by ¼) from a steady state value indicative of a frequency chip. The time-duration or width of each chip is determined by a counter 1865 which a constantly reset to zero except when the output of the threshold circuit 1860 is true. For this purpose, a NOT gate 1870 can be connected between the counter's input and reset terminals.

The number of chips of duration exceeding Mx is determined in a first branch 1870 while the number of chips of duration exceeding a longer time, Mxp, is determined in a second branch 1875. In the first branch 1870, a count thresholder 1880 holds its output high as long as the output of the counter 1865 exceeds Mx. The number of transitions in the output of the thresholder is counted by a counter 1885. The output of the counter 1885 is delayed in a delay element 1890 by the time interval $M_{TE}$ defined by the sequencer 360. The output of the delay element 1890 is latched at a latch 1895 at the pulse trailing edge by the end of pulse logic signal $L_{TE}$. The output of the latch 1895 is the number of frequency chips of durations exceeding Mx.

In the second branch 1875, a count thresholder 1880' holds its output high as long as the output of the counter 1865 exceeds the long time duration Mxp. The number of transitions in the output of the thresholder 1880' is counted by a counter 1885'. The output of the counter 1885' is delayed in a delay element 1890' by the time interval $M_{TE}$ defined by the sequencer 360. The output of the delay element 1890' is latched at a latch 1895' at the pulse trailing edge by the end of pulse logic signal $L_{TE}$. The output of the latch 1895' is the number of frequency chips of durations exceeding Mxp.

Figure 19:
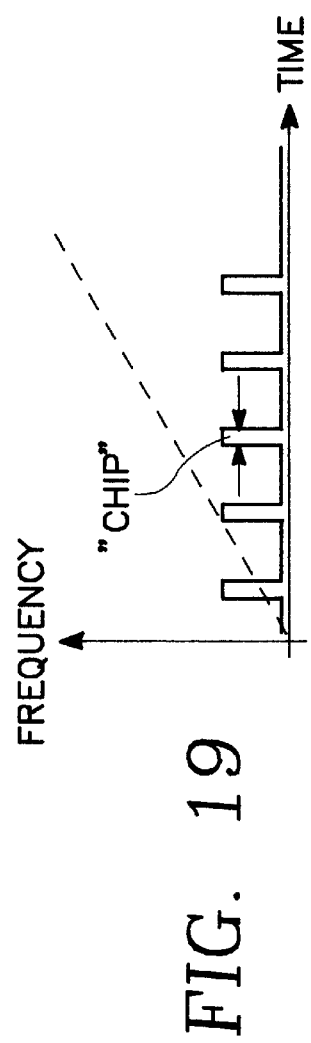
FIG. 19 is a graph illustrating the behavior of the measured frequency as a function of time in the presence of phase modulation (solid line) and frequency modulation or FM chirping (dashed line).

The graph of FIG. 19 illustrates how the sampled frequency behaves as a function of time in the presence of phase modulation (solid line curve) and in the presence of FM chirp modulation (dashed line). Phase modulation produces many frequent chips (pulses in the frequency) of short duration, while FM modulation and FM chirp modulation produce long chips. The parameter digital word data buffer 395 of FIG. 3 and the parameter digital word interface 150 of FIG. 1 together can compare Cx, the number of chips longer than Mx, and Cxp, the number longer than Mxp, in order to determine whether there is phase modulation. If Cxp is significantly greater than |Cxp−Cx|, then there is either FM modulation or FM chirp modulation. Whether it is FM or FM chirp is determined by inspecting the dF/dt term at the output of the estimator 385. On the other hand, if the opposite is true (i.e., |Cx−Cxp| is greater than Cxp), then there is phase modulation. The parameter digital word interface provides indication that the received signal is a continuous wave signal upon assertion of the logic signal $L_{CW}$ by the state sequencer 360 as described previously.

In summary, the system classifies a received signal as either CW or not CW (i.e., a pulse) by the state of the logic signal $L_{CW}$. If it is CW, then the system provides an estimate of the frequency, amplitude and time of arrival. If it is a pulse, then the system further provides the pulse width and identifies the type of modulation (if any) contained in the pulse. The types of modulation which the system can identify include frequency modulation, phase modulation and FM chirp modulation. If the pulse has FM chirp modulation, then the system further provides the time rate of change of the chirp frequency and the starting frequency of the chirp.

While the invention has been described in detail by specific reference to preferred embodiments, it is understood that variations and modifications thereof may be made without departing from the true spirit and scope of the invention.

What is claimed is:

1. A parameter encoder for identifying selected parameters of a digitally sampled incoming signal lying within a receiver bandwidth, wherein said receiver bandwidth is divided into plural contiguous frequency channels, each channel having a channel bandwidth, whereby said incoming signal is divided into plural channelized signals lying in respective ones of said plural frequency channels, said parameter encoder comprises plural channel processors connected to receive respective ones of said channelized signals, each of said channel processors comprising:

Fourier transform means for producing a frequency value and an amplitude value for each sample of the respective channelized signal;

a channel arbitrator comprising:

comparator means for comparing said amplitude value with a predetermined threshold, comparing said amplitude value with the corresponding amplitude values of adjacent ones of said channels and comparing said frequency value with corresponding frequency values of adjacent ones of said channels; and processor means for sensing whether a detected signal lies in said respective channel based upon at least one of:

(a) determination of a corresponding amplitudes values of said respective channel and its adjacent neighbor channels relative to said predetermined threshold, (b) determination of predominance of said frequency value over corresponding frequency values of adjacent neighbor channels, (c) determination of a difference between said frequency value and that of an adjacent neighbor channel exceeding a predetermined frequency threshold.

2. The parameter encoder of claim 1 further comprising a frequency arbitrator, said frequency arbitrator comprising:

comparator means for comparing said frequency value with upper and lower threshold frequencies near the maximum and minimum frequencies of the corresponding frequency channel, and for comparing amplitude values of adjacent neighbor channels with each other and with a predetermined threshold;

processor means for sensing whether said frequency value lies near one extreme of the frequency band of the channel and needs correcting by shifting it toward the opposite extreme, based upon at least one of:

(a) determination of said frequency value lying outside a band between said upper and lower frequencies, (b) determination of amplitude values of adjacent neighbor channels, corresponding in time with to said amplitude value, exceeding a predetermined threshold, (c) determination of an inequality between said amplitude values of said neighbor channels.

3. The parameter encoder of claim 1 wherein said channel processor further comprises:

a modulation on pulse identifier responsive to said channel arbitrator indicating a valid signal is present in said respective channel, said identifier comprising:

means for sensing chip transients in successive samples of said frequency value of said channelized signal;

means for measuring the time durations of said chip transients;

means for counting a first number of said chip transients having time durations falling within a predetermined low range and for counting a second number of said chip transients having time durations exceeding said low range; and means for classifying modulation in said channelized signal in accordance with said first and second numbers.

4. The parameter encoder of claim 3 wherein said means for classifying classifies said modulation as phase modulation if said first number exceeds said second number and for classifying it as one of frequency modulation and FM chirp otherwise.

5. The parameter encoder of claim 4 wherein said channel processor further comprises means for providing a time rate of change of said frequency value, wherein said classifying means discriminates between frequency modulation and FM chirp in accordance with a value of said time rate of change of said frequency value.

6. The parameter encoder of claim 5 wherein said channel processor further comprises a least squares estimator for providing an estimate of said frequency over plural samples of said channelized signal, said frequency estimator receiving said successive samples of said frequency value and outputting a least squares estimate of frequency, said means for providing a time rate of change of frequency comprises a frequency time rate of change output of said least squares estimator.

7. The parameter encoder of claim 1 wherein each channelized signal comprises a real component and an imaginary component and said Fourier transform means comprise:

a complex conjugate multiplier for multiplying each of said real and imaginary components by a one-sample-time delayed complex conjugate thereof; and a transformer for transforming a complex number whose real and imaginary components are the real and imaginary products from said complex conjugate multiplier into polar coordinates.

8. The parameter encoder of claim 5 wherein said channel processor further comprises a state sequencer, said sequencer comprising:
   means for indicating occurrence of a steady state region of said pulse of an amplitude within a second predetermined fraction of said peak amplitude exceeding said first fraction;
   wherein said modulation on pulse encoder performs said counting in response to said means for indicating occurrence of a steady state region of said pulse.

9. The parameter encoder of claim 8 wherein:
   said sequencer further comprises means for indicating a leading and trailing edge of a pulse in said respective channel corresponding to a first predetermined fraction of a peak pulse amplitude;
   said channel processor further comprises:
      a time of arrival encoder responsive to occurrence of said leading edge,
      a pulse width encoder responsive to a time interval between occurrence of said leading and trailing edges,
      an amplitude encoder responsive to occurrence of said steady state region for computing an average of successive amplitude samples over said steady state region.

10. The parameter encoder of claim 9 wherein said state sequencer further comprises means for indicating a continuous wave signal in said respective channel whenever a trailing edge fails to occur after a leading edge within a predetermined amount of time.

11. The parameter encoder of claim 9 wherein said channel processor further comprises a least squares estimator for providing an estimate of said frequency over plural samples of said channelized signal, said frequency estimator receiving said successive samples of said frequency value and outputting a least squares estimate of frequency, said estimator being responsive to said sequencer so as to take said plural samples only from said steady state region of said channelized signal.

12. The parameter encoder of claim 9 wherein said channel processor further comprises a threshold detector for detecting the presence of a pulse in said respective channel, said threshold detector comprising:
   means for indicating the beginning of a valid pulse after said amplitude value exceeds a first predetermined pulse threshold value, and
   means for indicating the end of a valid pulse after said amplitude value falls below a second predetermined pulse threshold value less than said first predetermined pulse threshold value.

13. The parameter encoder of claim 9 wherein said amplitude encoder comprises means for enabling said computing of said average only when the number of samples equals a power of two, and wherein said average is computed by binarily shifting a sum of amplitude samples by an amount corresponding to said power of two.

14. The parameter encoder of claim 9 wherein said modulation on pulse encoder comprises a delay line frequency discriminator and an anti-wrap circuit connected between said frequency discriminator and said means for detecting a frequency chip transient.

15. The parameter encoder of claim 11 wherein said channel processor further comprises an anti-wrap circuit at an input of said estimator for stabilizing successive samples of said frequency value.

16. The parameter encoder of claim 11 wherein said estimator comprises:
   a high speed section comprising:
      a first delay line summation loop for computing a sum of frequency samples
      a counter for generating a sample count, a multiplier for multiplying each frequency sample by the corresponding sample count and a second delay line summation loop for computing a sum of products of said multiplier,
      means responsive to said sequencer for enabling said first and second summation loops at a beginning of said steady state and terminating said first and second summation loops and latching said sample count upon the occurrence of said trailing edge; and
   a low speed section comprising means for generating a least squares matrix operator as a function of said sample count from said means for latching, and for matrix multiplying a 2-element vector whose first and second elements comprise the outputs of said first and second summation loops, respectively, by said least squares matrix operator.

17. A parameter encoder for identifying selected parameters of a digitally sampled incoming signal lying within a receiver bandwidth, wherein said receiver bandwidth is divided into plural contiguous frequency channels, each channel having a channel bandwidth, whereby said incoming signal is divided into plural channelized signals lying in respective ones of said plural frequency channels, said parameter encoder comprises plural channel processors connected to receive respective ones of said channelized signals, each of said channel processors comprising:
   Fourier transform means for producing a frequency value and an amplitude value for each sample of the respective channelized signal;
   a frequency arbitrator, said frequency arbitrator comprising:
      comparator means for comparing said frequency value with upper and lower threshold frequencies near the maximum and minimum frequencies of the corresponding frequency channel, and for comparing amplitude values of adjacent neighbor channels with each other and with a predetermined threshold;
      processor means for sensing whether said frequency value lies near one extreme of the frequency band of the channel and needs correcting by shifting it toward the opposite extreme, based upon at least one of:
         (a) determination of said frequency value lying outside a band between said upper and lower frequencies,
         (b) determination of amplitude values of adjacent neighbor channels, corresponding in time with to said amplitude value, exceeding a predetermined threshold,
         (c) determination of an inequality between said amplitude values of said neighbor channels.

18. The parameter encoder of claim 17 wherein said channel processor further comprises:
   a modulation on pulse identifier comprising:
      means for sensing chip transients in successive samples of said frequency value of said channelized signal;
      means for measuring the time durations of said chip transients;
      means for counting a first number of said chip transients having time durations falling within a predetermined low range and for counting a second number of said chip transients having time durations exceeding said low range; and means for classifying modulation in said channelized signal in accordance with said first and second numbers.

19. The parameter encoder of claim 18 wherein said means for classifying classifies said modulation as phase modulation if said first number exceeds said second number and for classifying it as one of frequency modulation and FM chirp otherwise.

20. The parameter encoder of claim 19 wherein said channel processor further comprises means for providing a time rate of change of said frequency value, wherein said classifying means discriminates between frequency modulation and FM chirp in accordance with a value of said time rate of change of said frequency value.

21. The parameter encoder of claim 20 wherein said channel processor further comprises a least squares estimator for providing an estimate of said frequency over plural samples of said channelized signal, said frequency estimator receiving said successive samples of said frequency value and outputting a least squares estimate of frequency, said means for providing a time rate of change of frequency comprises a frequency time rate of change output of said least squares estimator.

22. The parameter encoder of claim 17 wherein each channelized signal comprises a real component and an imaginary component and said Fourier transform means comprise:
   a complex conjugate multiplier for multiplying each of said real and imaginary components by a one-sample-time delayed complex conjugate thereof; and
   a transformer for transforming a complex number whose real and imaginary components are the real and imaginary products from said complex conjugate multiplier into polar coordinates.

23. The parameter encoder of claim 20 wherein said channel processor further comprises a state sequencer, said sequencer comprising:
   means for indicating occurrence of a steady state region of said pulse of an amplitude within a second predetermined fraction of said peak amplitude exceeding said first fraction;
   wherein said modulation on pulse encoder performs said counting in response to said means for indicating occurrence of a steady state region of said pulse.

24. The parameter encoder of claim 23 wherein:
   said sequencer further comprises means for indicating a leading and trailing edge of a pulse in said respective channel corresponding to a first predetermined fraction of a peak pulse amplitude;
   said channel processor further comprises:
      a time of arrival encoder responsive to occurrence of said leading edge,
      a pulse width encoder responsive to a time interval between occurrence of said leading and trailing edges,
      an amplitude encoder responsive to occurrence of said steady state region for computing an average of successive amplitude samples over said steady state region.

25. The parameter encoder of claim 24 wherein said state sequencer further comprises means for indicating a continuous wave signal in said respective channel whenever a trailing edge fails to occur after a leading edge within a predetermined amount of time.

26. The parameter encoder of claim 24 wherein said channel processor further comprises a least squares estimator for providing an estimate of said frequency over plural samples of said channelized signal, said frequency estimator receiving said successive samples of said frequency value and outputting a least squares estimate of frequency, said estimator being responsive to said sequencer so as to take said plural samples only from said steady state region of said channelized signal.

27. The parameter encoder of claim 24 wherein said channel processor further comprises a threshold detector for detecting the presence of a pulse in said respective channel, said threshold detector comprising:
   means for indicating the beginning of a valid pulse after said amplitude value exceeds a first predetermined pulse threshold value, and
   means for indicating the end of a valid pulse after said amplitude value falls below a second predetermined pulse threshold value less than said first predetermined pulse threshold value.

28. The parameter encoder of claim 24 wherein said amplitude encoder comprises means for enabling said computing of said average only when the number of samples equals a power of two, and wherein said average is computed by binarily shifting a sum of amplitude samples by an amount corresponding to said power of two.

29. The parameter encoder of claim 24 wherein said modulation on pulse encoder comprises a delay line frequency discriminator and an anti-wrap circuit connected between said frequency discriminator and said means for detecting a frequency chip transient.

30. The parameter encoder of claim 26 wherein said channel processor further comprises an anti-wrap circuit at an input of said estimator for stabilizing successive samples of said frequency value.

31. The parameter encoder of claim 26 wherein said estimator comprises:
   a high speed section comprising:
      a first delay line summation loop for computing a sum of frequency samples
      a counter for generating a sample count, a multiplier for multiplying each frequency sample by the corresponding sample count and a second delay line summation loop for computing a sum of products of said multiplier,
      means responsive to said sequencer for enabling said first and second summation loops at a beginning of said steady state and terminating said first and second summation loops and latching said sample count upon the occurrence of said trailing edge; and
   a low speed section comprising means for generating a least squares matrix operator as a function of said sample count from said means for latching, and for matrix multiplying a 2-element vector whose first and second elements comprise the outputs of said first and second summation loops, respectively, by said least squares matrix operator.

* * * * *